United States Patent [19]
Volk et al.

[11] Patent Number: 5,996,027
[45] Date of Patent: Nov. 30, 1999

[54] TRANSMITTING SPECIFIC COMMAND DURING INITIAL CONFIGURATION STEP FOR CONFIGURING DISK DRIVE CONTROLLER

[75] Inventors: Andrew M. Volk, Loomis; Vitnai Kam Leung, El Dorado Hills; Katen A. Shah, Orangevale, all of Calif.

[73] Assignee: Intel Corporation, Santa Clara, Calif.

[21] Appl. No.: 08/572,578

[22] Filed: Dec. 14, 1995

Related U.S. Application Data

[63] Continuation of application No. 07/993,372, Dec. 18, 1992, abandoned.

[51] Int. Cl.$^6$ .................................................. G06F 13/10
[52] U.S. Cl. .............................. 710/13; 710/10; 710/11; 360/69
[58] Field of Search ................ 371/37.1; 395/497.03, 395/806, 404, 411, 500, 800, 831; 360/69; 710/8, 13, 10, 11, 14

[56] References Cited

U.S. PATENT DOCUMENTS

| | | | |
|---|---|---|---|
| 3,714,635 | 1/1973 | Hamilton et al. | 395/500 |
| 3,950,735 | 4/1976 | Patel | 395/880 |
| 4,079,452 | 3/1978 | Larson et al. | 395/831 |
| 4,266,281 | 5/1981 | Strugger et al. | 395/800 |
| 4,500,933 | 2/1985 | Chan | 360/69 |
| 4,589,063 | 5/1986 | Shah et al. | 395/275 |
| 4,651,237 | 3/1987 | Willaims | 360/48 |
| 4,652,992 | 3/1987 | Mensch, Jr. | 395/800 |
| 4,803,623 | 2/1989 | Klashka et al. | 395/275 |
| 4,866,601 | 9/1989 | DuLac et al. | 364/200 |
| 4,972,470 | 11/1990 | Farago | 380/3 |
| 4,979,107 | 12/1990 | Advani et al. | 395/575 |
| 5,018,095 | 5/1991 | Nissimov | 395/404 |
| 5,028,922 | 7/1991 | Huang | 341/59 |
| 5,111,423 | 5/1992 | Kopec, Jr. et al. | 395/500 |
| 5,150,465 | 9/1992 | Bush et al. | 395/275 |
| 5,151,985 | 9/1992 | Sander et al. | 395/500 |
| 5,237,689 | 8/1993 | Behnke | 395/700 |
| 5,247,633 | 9/1993 | Nissimov et al. | 395/404 |
| 5,257,379 | 10/1993 | Cwiakala et al. | 395/700 |
| 5,313,585 | 5/1994 | Jeffries et al. | 395/411 |
| 5,317,695 | 5/1994 | Celi, Jr. | 395/275 |
| 5,335,338 | 8/1994 | Proesel | 395/500 |
| 5,379,382 | 1/1995 | Work et al. | 395/275 |
| 5,428,748 | 6/1995 | Davidson et al. | 395/275 |
| 5,448,710 | 9/1995 | Liu | 395/497.03 |
| 5,537,421 | 7/1996 | Dujari et al. | 371/37.1 |

*Primary Examiner*—Thomas C. Lee
*Assistant Examiner*—Harold Kim
*Attorney, Agent, or Firm*—Blakely, Sokoloff, Taylor & Zafman LLP

[57] ABSTRACT

A disk drive controller which can be programmed for compatibility with a variety of disk drives having differing interface requirements. Information regarding specific characteristics of a disk drive to be installed is loaded into a register in the disk drive controller. Information such as the drives data rate, density, precompensation, physical designation, and mode of operation of a disk drive can be programmed into the register. The interface between the disk drive controller and the disk drive is then configured according to the stored information.

25 Claims, 5 Drawing Sheets

TRANSMITTING SPECIFIC COMMAND DURING INITIAL CONFIGURATION STEP FOR CONFIGURING DISK DRIVE CONTROLLER

This is a continuation of application Ser. No. 07/993,372, filed Dec. 18, 1992, now abandoned.

FIELD OF THE INVENTION

The present invention pertains to the field of disk drive controllers. In particular, the present invention relates to a disk drive controller which can be configured to support a wide variety of different disk drives.

BACKGROUND OF THE INVENTION

With the explosion of personal computer (PC) systems, there has been an attendant explosion in disk drives. Personal computer systems often have one or more disk drives for storing software program codes and data. These disk drives typically store information as a series of digital bits. A magnetic transducer or "head" writes each bit of information onto a circular, spinning magnetic media. The stored information can later be retrieved by using the same head to read back the bits of information from the magnetic media. One popular storage media, known as "floppy" disks, are comprised of flexible magnetic media which are enclosed in plastic jackets for protection. These floppy disks are removable from the disk drives and are interchangeable. Floppy disks for PCs commonly come in two sizes, 5.25 and 3.5 inches in diameter. Typically, a single semiconductor chip known as a disk drive controller, is installed within the personal computer to provide control over various functions and to interface with the disk drive(s). Some examples of floppy disk drive controllers include the National Semiconductor PC8477, NEC UPD72064, Motorola 3221, and Intel 82077.

Because of the popularity of disk drives, there are an ever increasing number of disk drive types being built by a number of different manufacturers. Each disk drive type can have its own protocol. A further complication is the fact that each of the manufacturers can specify their own interface and signal requirements. As a result, the particular disk drive controller in a PC might be incompatible with certain types of disk drives made by certain manufacturers. Under such circumstances, the installation of disk drives is limited to those disk drives which the designers of the disk drive controllers have chosen to support. Thus, one major disadvantage with typical prior art disk drive controllers is that the installers of disk drives, such as manufacturers of personal computer systems, might be limited by the disk drive controller to certain types or brands of disk drives. Those disk drives which are compatible are not guaranteed to be the ones that offer the best features or which are the most economical.

Another associated problem is that disk drive controller manufacturers are faced with a dilemma in determining which disk drives to support. If they choose to support only one type of disk drive, they forfeit that share of the disk drive controller market for those disk drives which are incompatible. On the other hand, if the manufacturer chooses to market more than one type of controller to support a greater variety of drives, the manufacturer is faced with increased costs due to designing, stocking, and marketing a plurality of different controllers. Hence, it would be highly advantageous for a disk drive controller to be compatible with many different types of disk drives.

One prior art approach for increasing drive compatibility was to implement external jumpers, DIP switches, external logic or other types of hardware. However, these mechanisms do not allow a system designer to affect any internal operations of the floppy disk controller. Furthermore, such changes need to be separately controlled, at each access of the different drives that may be connected to the controller. This a cumbersome, labor intensive, and time consuming task. Moreover, this approach requires that the application be aware of the exact types of disk drives attached to the computer system along with their peculiarities.

A different prior art approach for increasing drive compatibility was to add separate, dedicated output pins on the disk drive controller for supporting different drives. However, increasing the pin count correspondingly increases the overall cost of the disk drive controller. In addition, there is a physical limitation on the number of pins which can be added and yet have the disk drive controller fit onto the computer's motherboard.

Thus, what is needed is a configurable disk drive controller which allows a system designer more flexibility in selecting the type and brand of disk drive to be installed. It would also be highly preferable if the type of drive used is transparent to the application software.

SUMMARY OF THE INVENTION

In view of the compatibility problems associated with interfacing a disk drive controller to different disk drives, one object of the present invention is to provide a disk drive controller which can be configured to support different disk drives having different interfacing schemes.

Another object of the present invention is to provide compatibility without increasing the pin counts of the disk drive controller chip.

Another object of the present invention is to implement a disk drive controller which can be software programmed to various interfacing configurations.

Another object of the present invention is to make the type of installed disk drive transparent to application software.

These and other objects of the present invention are implemented in a disk drive controller having an interface which can be configured according to a software program. A Drive Specification command is determined. The Drive Specification command specifies the particular types of disk drives which are installed in the computer system. It contains information such as which physical drive is being specified, precompensation, data rate table selects, and drive density select type. A set of registers within the disk drive controller is programmed with the appropriate Drive Specification command. In other words, a register contains the programming information to configure each drive that can be connected to the disk drive controller. The data that corresponds to the currently selected drive is used to reconfigure certain interface lines and internal operations of the disk drive controller to match the drive's requirements. This register is loaded with the appropriate Drive Specification command during the power-on self-test (POST) routine performed by the basic input/output system (BIOS). Preprogramming by the BIOS eliminates the need for application software to know anything of the computer system beyond the basics. The present invention also allows for virtual drive designations (i.e., programmable boot drive). Moreover, the present invention can support tape drives as well as floppy disk drives utilizing perpendicular recording. Furthermore, different modes of operation such as PC AT/EISA, Model 30, and PS/2 can be specified. Therefore, the present invention allows a single disk drive controller to be compatible with a wide variety of different disk drive types without increasing pin count nor utilizing external hardware.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A configurable disk drive controller is described. In the following description, for the purposes of explanation, numerous specific details such as register values, pin outs, signal polarities, data rates, drive types, etc. are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

Figure 1:
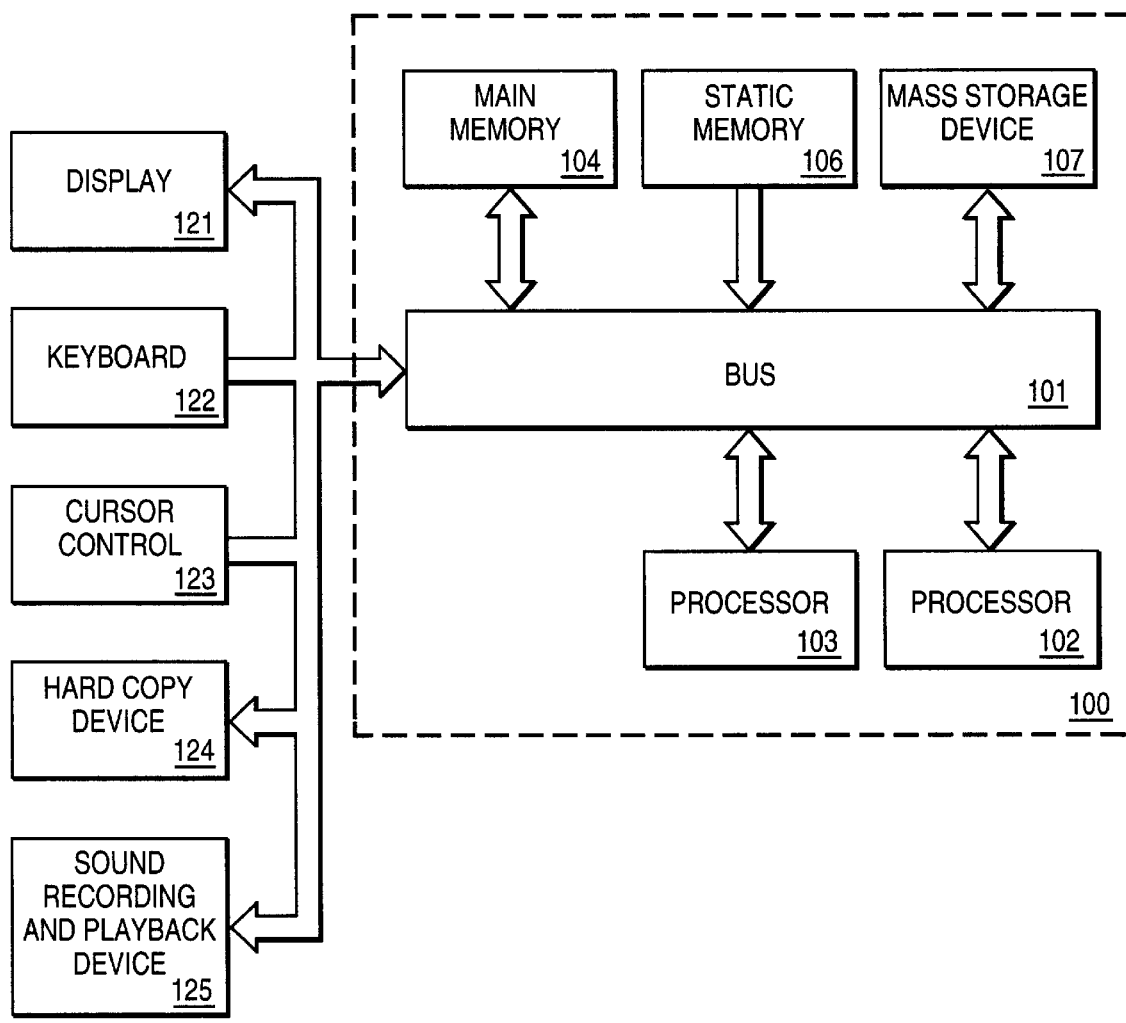
FIG. 1 is a block diagram of a computer system upon which the disk drive controller embodying the present invention can be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. Also coupled to bus 101 is disk drive controller 108 which provides an interface between processor 102 and floppy disk drive 107. Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 for communicating information and command selections to processor 102, and for controlling cursor direction keys, coupled to bus 101 for communicating direction information and command selections to processor 102, and for controlling cursor movement on display 121. This input device typically has two degrees of freedom in two axes, a first axis (e.g., x) and a second axis (e.g., y) which allows the device to specify any position in a plane. Another device which may be coupled to bus 101 is hard copy device 124 which may be used for printing instructions, data, or other information on a medium such as paper, film, or similar types of media. Lastly, computer system 100 may be coupled to a device for sound recording and/or playback 125 such as an audio digitizer means coupled to a microphone for recording information. Further, the device may include a speaker which is coupled to a digital to analog (D/A) converter for playing back the digitized sounds.

Figure 2:
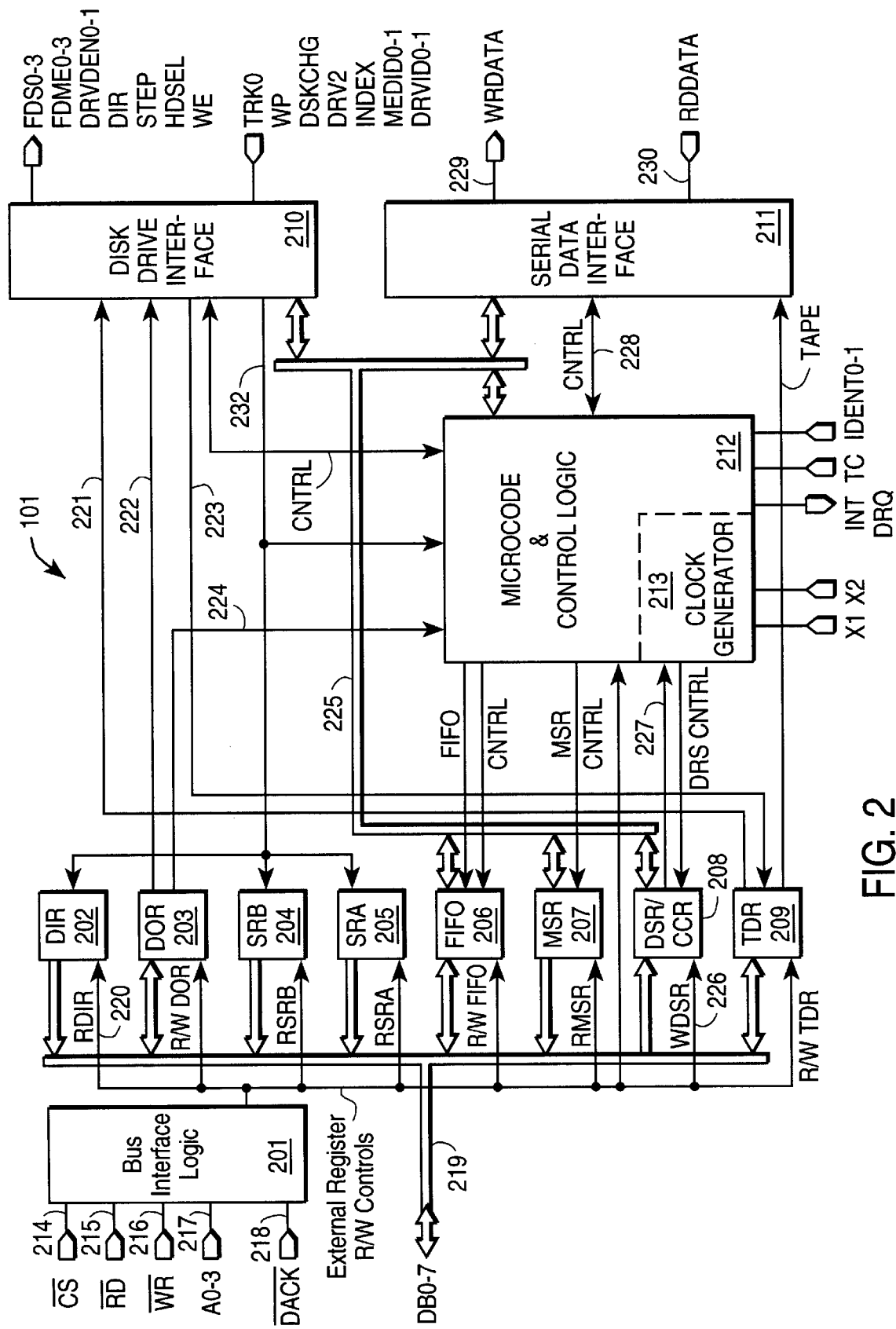
FIG. 2 is a block diagram of the disk drive controller 101 upon which the currently preferred embodiment of the present invention can be practiced.

FIG. 2 is an overall block diagram of the disk drive controller 108 upon which the currently preferred embodiment of the present invention can be practiced. Typically, disk drive controller 108 is comprised of bus interface logic 201, host interface registers 202–209, disk drive interface 210, serial data interface 211, microcode and control logic 212. In the currently preferred embodiment, bus interface logic 201 provides an interface between disk drive controller 108 and a digital computer by receiving a chip select $\overline{CS}$ on line 214, a read $\overline{RD}$ control signal on line 215, a write $\overline{WR}$ control signal on line 216, address lines A0–3 217 for selecting one of the registers 202–209, and a direct memory access (DMA) acknowledge $\overline{DACK}$ signal on line 218 for qualifying the $\overline{RD}$ and $\overline{WR}$ signals during DMA cycles.

Data bus DB0–7 219 transfers data to and from host interface registers 202–209. The arrowed bus sections indicate the direction of data transfer between DB0–7 219 and registers 202–209. Digital input register (DIR) 202 contains the status of digital input operations. It receives a read (RDDIR) signal 220 from bus interface logic 201 and disk drive interface pin status from disk drive interface 210. DIR 202 then outputs corresponding data onto data bus 219. Digital output register (DOR) 203 contains the drive select bits, motor enable bits (ME0–3), a reset bit, and a DMA gating bit. DOR 203 receives read/write control signals from bus interface logic 201. The motor enable bits ME0–3 and drive selects are transmitted between DOR 203 and disk drive interface 210 on line 222. Furthermore, a DOR reset signal is coupled via line 224 between DOR 203 and control logic 212. Status register A (SRA) 205 and status register B (SRB) 204 are read-only registers. They monitor the state of interrupts along with several of the disk interface pins. Both SRA 205 and SRB 204 output data onto data bus 219 and receive read (RSRA and RSRB, respectively) control signals from bus interface logic 201. Furthermore, SRA 205 and SRB 204 receive the disk drive interface pin status from interface 210.

FIFO 206 receives command parameter and disk data transfers. FIFO 206 inputs and outputs data on bus 219 in response to read and write signals (RD/WR FIFO) from bus interface logic 201. FIFO 206 a read/write (R/W) control signal from microcode and control logic 212. FIFO 206 also transfers data on internal data bus 225.

The main status register (MSR) 207 is a read-only register and is used for controlling command input and result output for all commands. MSR 207 outputs data on bus 219 in response to a read control (RD MSR) signal from bus interface logic 201. MSR 207 receives a microcode read/write from microcode and control logic 212 which instructs MSR 207 to transfer data onto internal data bus 225.

Data rate select and configuration control register (DSR/CCR) 208 is a write-only register which is primarily used for controlling the data rate. (Accesses to the CCR only write the data rate bits DRATE0–1.) The DSR also contains the precompensation programming bits. The data rate and precompensation bits are used to insure that the drive timing requirements are met. DSR/CCR 208 receives data from bus 219 in response to a write (WDSR) control signal on line 226 from bus interface logic 201. The data written into DSR/CCR 208 is also provided on line 227 to control logic 212. This same data can be read or written via internal data bus 225 on command from control logic 212.

The tape drive register (TDR) 209 provides a tape drive control signal to serial data interface 211. It also contains the boot drive select bits (BOOTSEL0–1) 221 for selecting which physical drive becomes the boot drive. All programming to the disk drive controller is referenced to the boot drive. Since the physical drive number and the programmed drive number can be different, the programmed drive number is a "virtual" address of a physical drive. Finally, TDR 209 takes the media ID (MEDID0–1) and drive ID (DRVID0–1) lines from disk drive interface 210 on line 223. TDR 209 also accesses bus 219 in response to read and write (R/W TDR) control signals from bus interface logic 201.

Disk drive interface 210 provides the interface between disk drive controller 108 and the disk drive. Interface 210 receives the motor enables and drive selects from DOR 203; control signals from microcode and control logic 212. Interface 210 accesses internal data bus 225. Interface 210 provides the motor enables (ME0–3); the drive selects (DS0–3); the direction (DIR) control signal for controlling direction of head movement; the step pulses (STEP); the head select control signal (HDSEL); and a write enable (WE) control signal to the disk drive and two DRVDEN signals that tell the floppy disk drive what mode it should take on. The operation of these signals is understood in the art. Interface 210 also provides two drive density select lines (DRVDEN0–1) that provides each drive with the mode of operation information that it needs when it is accessed. The action of these signals is key to this patent and will be explained in detail later in this disclosure. Interface 210 receives a track control line (TRK0) signal indicating the head is at track 0; a write protect (WP) signal indicating if the drive is write protected; a disk change (DSKCHG) control signal; two media ID (MEDID 0, 1) signals and two drive ID (DRVID 0, 1) signals; and an index (INDEX) signal indicating the start of a track from the disk drive. Likewise, the operation of these signals is also understood in the art.

Serial data interface 211 provides a serial data interface between disk drive controller 108 and the floppy disk drive. Serial data interface 211 can access internal data bus 225. It receives control signals from microcode and control logic 212. Serial data interface 211 drives serial data on the WRDATA 229 line to the disk drive. Interface 211 also receives serial data from the disk via 230.

Microcode and control logic 212 is responsible for interpreting commands and controlling the operations of disk drive controller 108 to ensure its function is carried out.

Control logic 212 generates signals to disk drive interface logic 210, serial data interface 211, and FIFO 206. Control logic 212 receives the disk drive interface pin status on line 232 from interface 210. Control logic 212 accesses internal data bus 225 and receives a terminal count (TC) signal from external sources for terminating the current disk transfer. It also receives two identity (IDENT 0, 1) signals for selecting the interface mode. Furthermore, control logic 212 generates an interrupt signal (INT) along with a DMA request (DRQ) signal. Besides those connections mentioned above, control logic 212, receives hardware reset signal (RESET) and clock connections X1 and X2.

Figure 4:
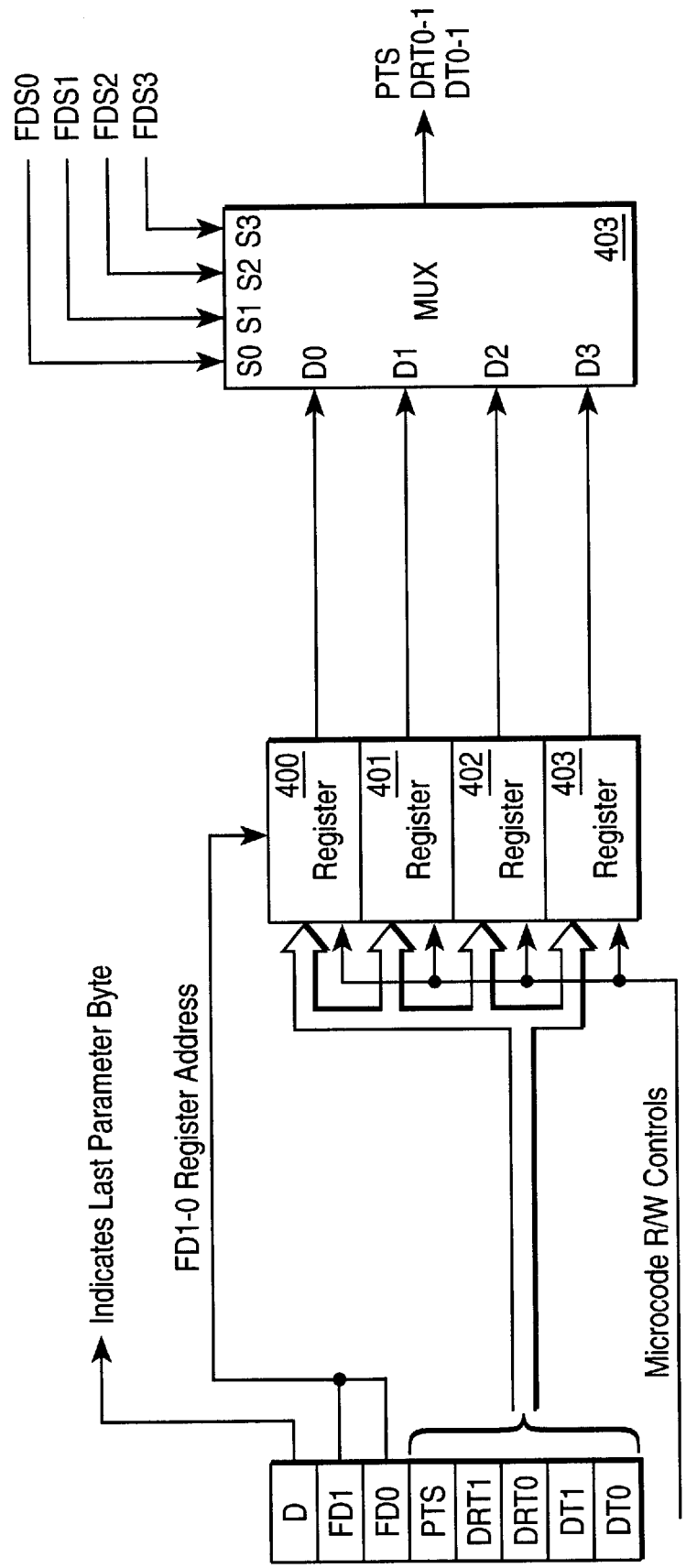
FIG. 4 is a block diagram of the register holding the Drive Specification command data.

Command handling of the disk drive controller is divided into three phases: Command, Execution, and Result. After a reset, the disk drive controller is ready for the Command phase. It is ready to accept a command from the host. For each of the commands, a defined set of command code bytes and parameter bytes is written to the disk drive controller. It is during the Command phase that a Drive Specification command is sent. The parameters sent with this command are loaded into registers in the disk drive controller (FIG. 4). The Drive Specification command is used to select/disable the DSR programmed precompensation table, to specify the operation of two pins, labeled DRVDEN0 and DRVDEN1 and to specify 2 Mbps operation for newer tape drives. It is this command which removes the need for hardware workaround to accommodate various drives. This command is protected from software resets. Once the Drive Specification command has been executed, subsequent software resets do not affect the programmed parameters. Only another Drive Specification command or a hardware (H/W) reset can affect the programmed parameters. The H/W reset clears all bits to zero, the default value. Only issuance of another Drive Specification command or a hardware (H/W) reset causes it to reset to default values. The Drive Specification command is most likely to be programmed when the basic input/output system (BIOS) is conducting the power-on self-test (POST) routine. By programming this command, the disk drive controller internally configures the correct values for the two pins, DRVDEN0 and DRVDEN1, with corresponding precompensation and data rate tables enabled for the particular type of disk drive or tape drive to be installed. Hence, preprogramming by the BIOS eliminates the need for application software to know anything of the computer system beyond the basics.

The Drive Specification command has no Execution Phase, which is used to transfer data to or from the disk drive. Since there is no Execution Phase, there is no interrupt signal (INT) to indicate its end. The existence of the Results Phase is programmable through an option bit in the command's last parameter byte.

Table 1 below illustrates the Drive Specification command for the Command and Result phases.

TABLE 1

| | Drive Specification Command | | | | | | | | | |
|---|---|---|---|---|---|---|---|---|---|---|
| | R/W | 7 | 6 | 5 | 4 | 3 | 2 | 1 | 0 | |
| Command | W | 1 | 0 | 0 | 0 | 1 | 1 | 1 | 0 | Command |
| Phase | W | D = 0 | FD1 | FD0 | PTS | DRT1 | DRT0 | DT1 | DT0 | Code |
| | : | : | : | : | : | : | : | : | : | Parameters |
| | W | D = 1 | NRP | 0 | 0 | 0 | 0 | 0 | 0 | : |
| Result | R | 0 | 0 | 0 | PTS | DRT1 | DRT0 | DT1 | DT0 | Drive 0 |
| Phase | R | 0 | 0 | 0 | PTS | DRT1 | DRT0 | DT1 | DT0 | Drive 1 |

TABLE 1-continued

| | | | | | Drive Specification Command | | | | |
|---|---|---|---|---|---|---|---|---|---|
| R/W | 7 | 6 | 5 | 4 | 3 | 2 | 1 | 0 | |
| R | 0 | 0 | 0 | PTS | DRT1 | DRT0 | DT1 | DT0 | Drive 2 |
| R | 0 | 0 | 0 | PTS | DRT1 | DRT0 | DT1 | DT0 | Drive 3 |

The No Results Phase (NRP) bit is used to indicate circumstances wherein the Results Phase is skipped. When the NRP bit is set high, the Result Phase is skipped. Otherwise, the disk drive controller generates a Result Phase. The D indicates the last byte of the Drive Specification command. The disk drive controller checks this bit. If it is low, the disk drive controller expects more Drive Specification bytes. Otherwise, if the D bit is set high (i.e., D="1"), the disk drive controller terminates the Command phase and initiates the Results phase. The disk drive controller ignores any parameters on the byte line that has this bit set high. Sending a Drive Specification command followed immediately by a byte with the D bit set to a one allows the disk drive controller to check the currently set drive specifications.

Figure 3:
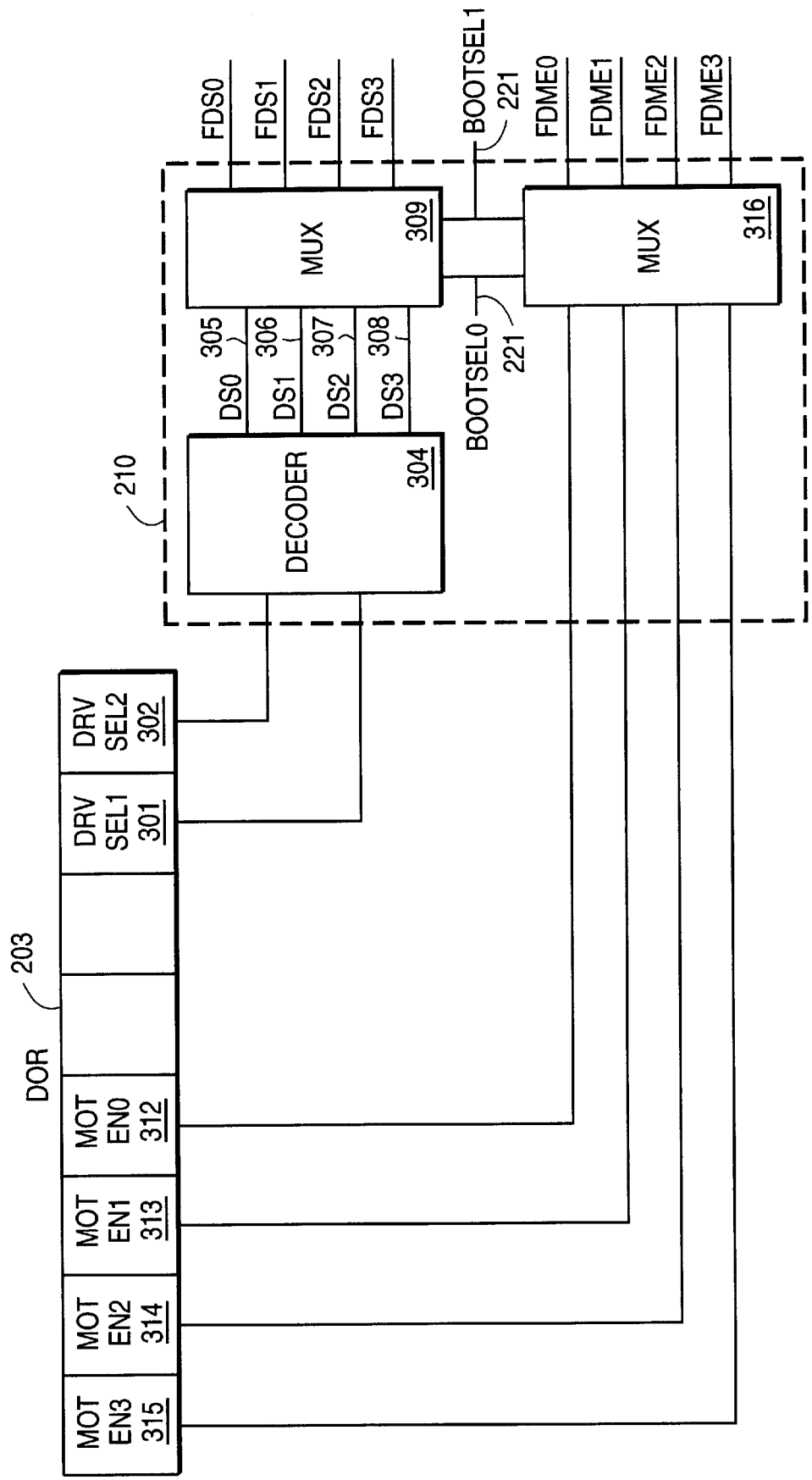
FIG. 3 is a block diagram illustrating the implementation of virtual drive designations.

FIG. 3 is a block diagram illustrating the implementation of virtual drive designations. The DRVSEL1 bit 301 and DRVSEL2 bit 302 in DOR register 203 are input to decoder 304 which generates the DS0–3 signals on lines 305–308. The DS0–3 signals are input to multiplexer 309. The BOOTSEL0 signal on line 221 and BOOTSEL1 signal on line 221 enable a user to exchange the output drive signals, thereby allowing different drives to be the boot drive. The ME0–3 signals from the MOTEN0–3 bits 312–315 in DOR register 203 are identically mapped via multiplexer 316 to actual pins FDME0–3 based on the BOOTSEL0 and BOOTSEL1 signals. The DS0–3 and ME0–3 bits are considered as virtual designations, since each of these signals can be remapped to different corresponding physical FDS0–3 and FDME0–3 pins, based on the BOOTSEL0 and BOOTSEL1 signals. Once the BOOTSEL0–1 bits are configured for a non-default selection, future references made to the disk drive controller are assumed as virtual designations. Table 2 below shows how the DS0–3 and ME0–3 signals are mapped to actual pins FDS0–3 and FDME0–3 based on the BOOTSEL0–1 bits (selected in the TDR register) 209.

TABLE 2

| BOOTSEL1 | BOOTSEL0 | | Mapping: |
|---|---|---|---|
| 0 | 0 | Default | DS0→FDS0, ME0→FDME0 |
| | | | DS1→FDS1, ME1→FDME1 |
| | | | DS2→FDS2, ME2→FDME2 |
| 0 | 1 | | DS0→FDS1, ME0→FDME1 |
| | | | DS1→FDS0, ME1→FDME0 |
| | | | DS2→DFS2, ME2→FDME2 |
| 1 | 0 | | DS0→FDS2, ME0→FDME2 |
| | | | DS1→FDS1, ME1→FDME1 |
| | | | DS2→FDS0, ME2→FDME0 |
| 1 | 1 | | Reserved |

For example, if BOOTSEL1, BOOTSEL0=10, then DOR [1:0]=00 (i.e., DOR bits 0 and 1=0 s) signifies that drive 2 and the FDS2 and FDME2 lines are activated. Also, if TAPESEL [1:0]=10, then tape mode is selected whenever FDS0 and FDME0 are selected.

Virtual addressing allows for flexible mapping of the boot drive, but it must not confuse the drive specification parameter mapping. This is why the physical drive (FDS0–3) selects which drive specification register is used (FIG. 4). Referring back to the FD0 and FD1 bits in the Drive Specification command, these two bits correspond to FDS and FDME pins on the disk drive interface. Table 3 below illustrates the relationship between the FD0–1 signals to the drive slot, FDS and FDME pins.

TABLE 3

| FD0 | FD1 | Drive slot | Physical Drive Set | Physical Motor Enable |
|---|---|---|---|---|
| 0 | 0 | drive 0 | FDS0 | FDME0 |
| 0 | 1 | drive 1 | FDS1 | FDME1 |
| 1 | 0 | drive 2 | FDS2 | FDME2 |
| 1 | 1 | drive 3 | FDS3 | FDME3 |

The Precompensation Table Select (PTS) bit of the Drive Specification command selects whether to enable the precompensation values programmed in the DSR register. In the default state, the values programmed in the DSR are utilized. In other words, PTS=0 implements DSR programmed precompensation delays; PTS=1 indicates no precompensation delay for the corresponding drive. Write precompensation is a way of preconditioning the output data signal to adjust for the effects of bit shift on the data as it is written to the magnetic disk surface. Bit shift is caused by the magnetic interaction of data bits as they are written to the disk surface, and has the effect of shifting these data bits away from their nominal position in the serial MFM data pattern. Data that is subject to bit shift is much harder to read by a data separator, and can cause soft read errors. Write precompensation predicts where bit shift could occur within a data pattern. It then shifts the individual data bits early, late, or not at all such that when they are written to the disk, the resultant shifted data bits will be back closer to their normal position.

The present invention supports software programmable write precompensation. Upon power up, the default write precomp values will be used. The programmer can choose a different value of write precomp with the DSR register if desired (see Table 4). Also on power up, the default starting track number for write precomp is track zero. This starting track number for precomp can be changed.

TABLE 4

| PRECOMP Bits DRS [4:2] | Precompensation Delay |
|---|---|
| 111 | 0.00 ns-DISABLED |
| 001 | 41.67 ns |
| 010 | 83.34 ns |
| 011 | 125.00 ns |
| 100 | 166.67 ns |
| 101 | 208.33 ns |
| 110 | 250.00 ns |
| 000 | DEFAULT |

The two bits, DRT0 and DRT1, of the Drive Specification command are implemented to select between different data rate tables. These two bits also provide mapping of the data rates selected in the DSR and CSR registers. Table 5 illustrates how these values are mapped.

TABLE 5

| Bits in DSR/CCR | | | | | Bits Returned via DIR (Only in PS/2 Mode) | | |
|---|---|---|---|---|---|---|---|
| DRT0 | DRT1 | DRATE1 | DRATE0 | Data Rate | DRATE1 | DRATE0 | Operation |
| 0 | 0 | 1 | 1 | 1 Mbps | 1 | 1 | Default |
|  |  | 0 | 0 | 500 Kbps | 0 | 0 |  |
|  |  | 0 | 1 | 300 Kbps | 0 | 1 |  |
|  |  | 1 | 0 | 250 Kbps | 1 | 0 |  |
| 0 | 1 | 1 | 1 | 1 Mbps | 1 | 1 | 2 Mbps Tape |
|  |  | 0 | 0 | 500 Kbps | 0 | 0 | Drive Mode |
|  |  | 0 | 1 | 2 Mbps | 1 | 1 |  |
|  |  | 1 | 0 | 250 Kbps | 1 | 0 |  |
| 1 | 0 | x | x | — | x | x | (Reserved) |
| 1 | 1 | 1 | 1 | 1 Mbps | 1 | 1 | Perpendicular |
|  |  | 0 | 0 | 500 Kbps | 0 | 0 | Mode FDDs |
|  |  | 0 | 1 | (Illegal) | — | — |  |
|  |  | 1 | 0 | 250 Kbps | 1 | 0 |  |

The mapped values are provided for read back by the system software, as indicated by the DIR register. The currently preferred embodiment of the present invention can be programmed for compatibility with perpendicular recording floppy drives. Perpendicular recording differs from the traditional longitudinal method by orienting the magnetic bits vertically. This scheme packs in more data bits for the same area. The disk drive controller with perpendicular recording drives can read standard 3.5" floppies as well as read and write perpendicular media. Some manufacturers offer drives that can read and write standard and perpendicular media in a perpendicular media drive.

Lastly, the DT0 and DT1 bits of the Drive Specification command are used to select the outputs on the DRVDEN0 and DRVDEN1 lines based on the mode of operation that was selected via the IDENT0 and IDENT1 pins. Upon hardware RESET, the IDENT0–1 inputs select between three interface modes: AT/EISA, PS/2, and Model 30 modes. After RESET, these inputs select the type of drive being accessed and alters the level of the Density select DRVDEN0 and DRVDEN1 signals. The type of signals that were found to be needed for the vast majority of drives used in PCs were always some paired combination of four signals: DRATE0 and DRATE1, the two data rate bits in the DSR/CCR register 208; and the true and complement forms of DENSEL, indicating whether a low (250/300 Kbps) or high (500 Kbps/1 Mbps) data rate has been selected. DENSEL is formed as the exclusive-OR of DRATE0 and DRATE1. When DENSEL is a one the data rate is low. DENSEL was a pin available on many prior art disk controllers.

Table 6 illustrates the relationships between the IDENT0–1, DT0–1 and DRVDEN0–1 signals. Table 7 gives the relationship between the DRATE0–1, DENSEL, DENSEL# and selected data rate. Note that the data rate selected by DRATE1=0 and DRATE0=1 can be either 300 Kbps or 2 Mbps. The actual value is determined by the value of the DRT0–1 bits (see table 5).

TABLE 6

| IDENT0 | IDENT1 | DT0 | DT1 | DRVDEN0 | DRVDEN1 | MODE |
|---|---|---|---|---|---|---|
| 1 | x | 0 | 0 | DENSEL | DRATE0 | AT/EISA |
|  |  | 0 | 1 | DRATE1 | DRATE0 |  |
|  |  | 1 | 0 | DENSEL# | DRATE0 |  |
|  |  | 1 | 1 | DRATE0 | DRATE1 |  |
| 0 | X | 0 | 0 | DRATE0 | DRATE1 | MODEL 30 |
|  |  | 0 | 1 | DENSEL | DRATE0 |  |
|  |  | 1 | 0 | DENSEL# | DRATE0 | PS/2 |
|  |  | 1 | 1 | DRATE1 | DRATE0 |  |

DENSEL is a signal internal to the current embodiment that indicates whether a low (e.g., 250/300 Kbps) or high (e.g., 500 Kbps/1 Mbps) data rate has been selected. DENSEL# is an inverted DENSEL signal, used by some types of disk drives. The DRATE0 and DRATE1 signals have values as programmed in the DSR register. They are used to select one of five data rates as listed in Table 7. DRATE1–0=10 selects different data rates depending on the value of the DRT bits.

TABLE 7

| DRATE1 | DRATE0 | DENSEL | DENSEL# | DATA RATE |
|---|---|---|---|---|
| 1 | 1 | 0 | 1 | 1 Mbps |
| 0 | 0 | 0 | 1 | 500 Kbps |
| 0 | 1 | 1 | 0 | 300 Kbps/2Mbps |
| 1 | 0 | 1 | 0 | 250 Kbps |

Referring to FIG. 4, two floppy drive select bits, FD0 and FD1, are used to specify which internal register 400–403 receives the parameter data (i.e., PTS, DRT1, DRT0, DT1, and DT0). The registers 400–403 are directly associated with each of the four possible physical drives. The physical drives are selected by pins FDS0–3 of multiplexer 404. The register selected by bits FD1=0 and FD0=0 corresponds to the disk drive selected by FDS0, FD1=0 and FD0=1 corresponds to FDS1, FD1=1 and FD0=0 corresponds to FDS2, and FD1=1 and FD0=1 corresponds to FDS3. Only one of the FDS lines may be active at a time. The selected drive takes the drive specification data from its corresponding register through the data MUX.

Figure 5:
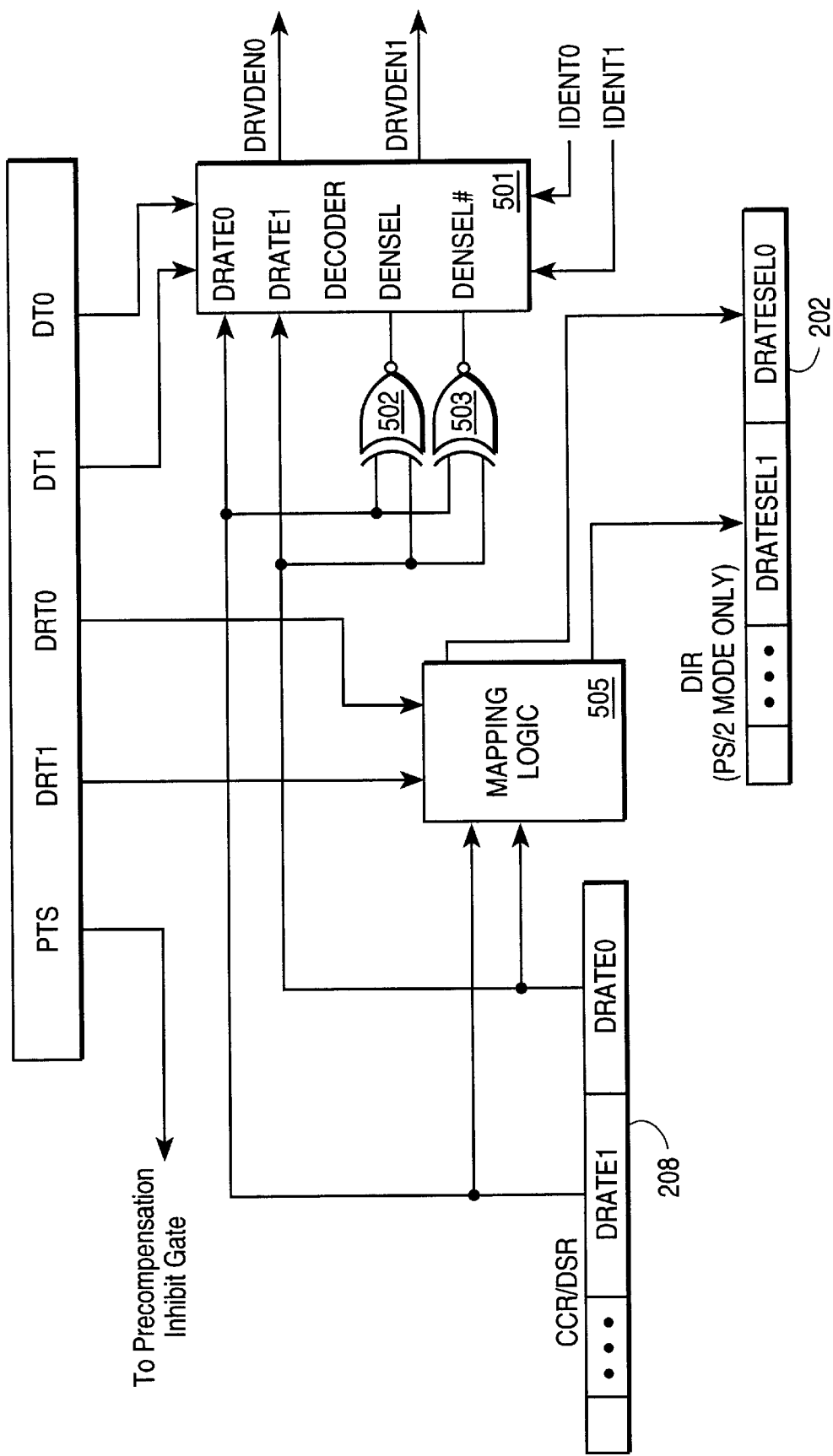
FIG. 5 is a block diagram illustrating the functions of the Drive Specification command.

FIG. 5 is a block diagram illustrating the functions of the Drive Specification command. The DT1 and DT0 bits and the IDENT1 and IDENT0 bits are input to decoder 501 to select amongst the DRATE0, DRATE1, DENSEL and DENSEL# signals to be output on DRVDEN0 and DRVDEN1, lines 502, and 503. The DRATE0 and DRATE1 signals from CCR/DSR registers 208 are input directly to decoder 501, and are input to the two exclusive OR gates 502 and 503 to implement DENSEL and DENSEL# functions. The output of exclusive OR gate 503 is inverted. The DRT0 and DRT1 Drive Specification bits are input to mapping logic 505 along with DRATE0 and DRATE1. These four signals are mapped to the DRATE0 and DRATE1 bits of DIR register 202 and control the internal clock rate. The PTS bit is input to precompensation inhibit gate. The FD0 and FD1 bits are used by the internal microcode to select the register into which the drive specification data is loaded. Note that the present invention allows for a plurality of disk drives to be daisy chained together through one ribbon cable, provided that each disk drive is properly accessed. Also note that in the currently preferred embodiment, the six least significant bits of the last byte of the Drive Specification command are not currently used. However, these bits can be used to provide additional features.

Table 8 illustrates a sample list of the different types and brands of disk and tape drives as the present invention can be programmed for compatibility.

TABLE 8

| System Mode | DRVDEN0 | DRVDEN1 | Drive Type |
|---|---|---|---|
| PC-AT/EISA | DENSEL | DRATE0 | 4/2/1 MB 3.5" and 2/1 MB 5.25" FDDs |
|  | DRATE1 | DRATE0 | 4/2/1 MB 3.5" FDDs (Sony MP-F40W-14/15) |
|  | DENSEL# | DRATE0 | PS/2 mode 2/1 MB 3.5"/5.25" FDDs, |
|  | DRATE0 | DRATE1 | 2/1.6/1 MB FDDS |
| PS/2 and | DRATE0 | DRATE1 | 4/2/1 MB 3.5" PS/2 mode FDDs |
| Model 30 | DENSEL | DRATE0 | 4/2/1 mB 3.5" and 2/1 5.25" PC-AT mode FDDs |
|  | DENSEL# | DRATE0 | Older PS/2 mode FDDs |
|  | DRATE1 | DRATE0 | 2/1.6/1 MB FDDs |

The following example shows how the present invention allows a disk drive controller to be compatible with a number of different disk drives. If an installer (e.g., an end user, a computer systems manufacturer, or whoever else) wishes to install one or more recording drives to a computer system, the corresponding Drive Specification Command is determined and loaded during the BIOS POST routine. Given an installation of a PS/2 mode 2/1 MB 3.5" floppy disk drive (FDD); a 4/2/1 MB 3.5" FDD having perpendicular mode recording; and a 2 MB tape drive, as physical drives 0–2 respectively, DRVDEN0 corresponds to DENSEL#, DENSEL, and DON'T CARE for the three drives. Likewise, DRVDEN1 corresponds to DRATE0, DRATE1, and DON'T CARE. In turn, this translates into DT0=1, 0, and DON'T CARE and DT1=0, 0, and DON'T CARE. Given a default, perpendicular mode, and 2 Mbps tape 1, the DRT0 bits are set to 0, 1, and 0. Likewise, the DRT1 bits are set to 0, 1, and 1, according to the data rate table. Given that the 2 Mbps tape drive does not require precompensation, its PTS bit is set high. The PTS bits for the two FDDs are set low. Therefore, this yields the Drive Specification commands shown below, which are loaded into the disk drive controller.

|  | FD1 | FD0 | PTS | DRT1 | DRT0 | DT1 | DT0 |
|---|---|---|---|---|---|---|---|
| Drive 0 | 0 | 0 | 0 | 0 | 0 | 1 | 0 |
| Drive 1 | 0 | 1 | 0 | 1 | 1 | 0 | 0 |
| Drive 2 | 0 | 0 | 1 | 1 | 0 | 0 | 0 |

Thus, a configuration disk drive controller is disclosed.

What is claimed is:

1. A controller for controlling a magnetic recording system having one of a plurality of interface requirements, said controller comprising:
   an interface means for providing a plurality of control signals to said magnetic recording system;
   a register means for storing precompensation, data rate, and magnetic storage density information, said precompensation, data rate, and magnetic storage density information being provided to said interface means;
   and
   a means for configuring said interface means according to said precompensation, data rate, and magnetic storage density information provided by said register means, wherein said means for configuring said interface means comprises a specification command transmitted during an initial configuration step and encoded on one or more control signals of said plurality of control signals, the configuration of said interface means upon execution of said specification command being protected from a software reset.

2. A controller as claimed in claim 1, further comprising a plurality of interface means each for providing a separate interface to a separate magnetic recording system, and a plurality of corresponding register means for storing precompensation, data rate, and magnetic storage density information indicative of separate interface requirements of the corresponding separate magnetic recording system, wherein said means for configuring configures each of said plurality of interface means according to the precompensation, data rate, and magnetic storage density information in the corresponding register means.

3. A controller as claimed in claim 2, wherein said plurality of interface means provide an interface to at least one disk drive and a magnetic tape drive system.

4. A controller as claimed in claim 2, wherein said register means also stores information specifying a bootup disk drive.

5. A controller as claimed in claim 2, wherein said specification command is written to said register means during a power-on self-test routine of a basic input/output system program executed by a computer system containing said controller.

6. In a computer system having a processor coupled to a disk drive by way of a programmable disk drive controller, said programmable disk drive controller comprising:
   a programmable register for storing precompensation, data rate, and drive density information; and
   a disk drive interface programmed according to the precompensation, data rate, and drive density information provided by said programmable register, said disk drive interface providing a plurality of control signals to said disk drive to control said disk drive, wherein said programmable register is programmed with said precompensation, data rate, and drive density information through a specification command transmitted during an initial configuration step and encoded on one or more control signals of said plurality of control signals, the configuration of said disk drive interface upon execution of said specification command being protected from a software reset.

7. The programmable disk drive controller of claim 6, wherein said specification command is loaded into said programmable register during a power-on self-test routine of a basic input/output system program executed by said computer system.

8. The programmable disk drive controller of claim 7, wherein said disk drive includes one or more floppy disk drives.

9. The programmable disk drive controller of claim 8, wherein said programmable disk drive controller provides control of a tape drive system.

10. A computer system having a processor coupled to a plurality of magnetic data storage means by way of a programmable controlling means, said programmable controlling means comprising:
a processor interface means for receiving from said processor respective configuration data relating to each of said plurality of magnetic data storage means and storing the respective configuration data in corresponding memory means, said respective configuration data including precompensation, data rate, and magnetic storage density information, wherein said configuration data is written to said corresponding memory means through a specification command transmitted during an initial configuration step and encoded on one or more control signals, the configuration of said interface means upon execution of said specification command being protected from a software reset; and
a data storage interface means for interfacing said programmable controlling means to each of said plurality of magnetic data storage means, said programmable controlling means providing a plurality of control signals to each of said plurality of magnetic data storage means, said data storage interface means being programmable to interface with each of said plurality of magnetic data storage means in accordance with the respective configuration data provided by the corresponding memory means.

11. A computer system as claimed in claim 10, wherein said memory means stores configuration data specifying a boot up disk drive.

12. A computer system as claimed in claim 11, wherein said plurality of magnetic data storage means comprises at least one floppy disk drive and at least one magnetic tape drive.

13. A computer system as claimed in claim 10, wherein said specification command is written to said corresponding memory means during a power-on self-test routine of a basic input/output system program executed by said computer system.

14. A method of interfacing a magnetic storage system to a computer system with a programmable disk drive controller, said method comprising the steps of:
coupling the magnetic storage system to the computer system by way of the programmable disk drive controller;
transferring configuration data related to characteristics of said magnetic storage system from said computer system to said programmable disk drive controller, said configuration data including precompensation, data rate, and magnetic storage density information, and encoded on one or more control signals coupling said magnetic storage system to said computer system;
storing said configuration data in said programmable disk drive controller during an initial configuration step;
maintaining said configuration data in said programmable disk drive until a hardware reset is received by said computer system;
configuring an interface of said disk drive controller to the magnetic storage system on the basis of the configuration data; and
providing a plurality of control signals from said disk drive controller to said magnetic storage system responsive to said configuration data.

15. The method of claim 14 further comprising the step of disabling precompensation for said magnetic storage system.

16. The method of claim 15 wherein said step of transferring configuration data is performed during power-on self-test by a basic input/output system of said computer system, said method further comprising the step of configuring said interface to support perpendicular recording systems.

17. The method of claim 16 further comprising the step of configuring said interface to support a tape drive.

18. A computer system comprising:
a processor;
a magnetic storage media having an associated interface requirement;
a bus; and
a programmable controller for coupling said magnetic storage media to said processor by way of said bus, said programmable controller being a single integrated circuit, said programmable controller comprising
a register for storing configuration information associated with the magnetic storage media, said configuration information including precompensation and data rate information, said configuration information written to said register through a specification command transmitted during an initial configuration step and encoded on one or more control signals in said bus, the configuration of said register upon writing of said configuration information being maintained until a hardware reset of said computer system occurs; and
an interface which is programmable with said configuration information so as to control said magnetic storage media by providing a plurality of control signals to said magnetic storage media.

19. The computer system as claimed in claim 18, further comprising a plurality of magnetic storage medias having separate associated interface requirements, and wherein said programmable controller comprises a plurality of interfaces, each of said plurality of interfaces having a corresponding register, each of said plurality of interfaces being programmable according to configuration information provided by the corresponding register.

20. The computer system as claimed in claim 19, wherein said configuration information further comprises a bit of data for specifying perpendicular mode recording.

21. The computer system as claimed in claim 18, wherein said configuration information is stored in said register during a power-on self-test routine of a basic input/output system.

22. A computer system comprising:
a processor;
a magnetic storage media having an associated interface requirement;
a bus;
a plurality of magnetic storage media having separate associated interface requirements, and wherein said programmable controller comprises a plurality of interfaces, each of said plurality of interfaces having a corresponding register, each of said plurality of interfaces being programmable according to configuration information provided by the corresponding register; and
a programmable controller for coupling said magnetic storage media to said processor by way of said bus, said programmable controller comprising:
  a register for storing configuration information associated with the magnetic storage media, said configuration information including precompensation, data rate information, and perpendicular mode recording information, said configuration information being stored in said register during a power-on self-test routine of a basic input/output system; and
  an interface which is programmable with said configuration information so as to control said magnetic storage media by providing a plurality of control signals to said magnetic storage media, and wherein said configuration information is encoded on one or more control signals of said plurality of control signals.

23. An apparatus comprising:
an interface coupled to a magnetic recording system, said magnetic recording system having one of a plurality of interface requirements, said interface configured to provide a plurality of control signals to said magnetic recording system;
a register configured to store precompensation, data rate, and magnetic storage density information, said precompensation, data rate, and magnetic storage density information being provided to said interface; and
a configuration manager configured to configure said interface according to said precompensation, data rate, and magnetic storage density information provided by said register, wherein said configuration manager and said interface comprises a specification command transmitted during an initial configuration step and encoded on one or more control signals of said plurality signals, the configuration of said register upon writing of said specification command being protected from a software reset.

24. The apparatus of claim 23 wherein said specification command is reset through a hardware reset of said magnetic recording system.

25. The apparatus of claim 23 wherein said specification command is reset by a new specification command.

* * * * *